June 3, 1958 W. B. RETZ 2,837,205
CHUCK POSITIONING MEANS
Filed Oct. 1, 1954 2 Sheets-Sheet 1

INVENTOR
William B. Retz
BY
Mitchell Becket
ATTORNEYS

INVENTOR
William B. Retz
BY
ATTORNEYS

United States Patent Office 2,837,205
Patented June 3, 1958

2,837,205

CHUCK POSITIONING MEANS

William B. Retz, Plainville, Conn., assignor to The New Britain Machine Company, New Britain, Conn., a corporation of Connecticut Application October 1, 1954, Serial No. 459,592

7 Claims. (Cl. 198—210)

My invention relates to a chuck positioning mechanism. When irregularly shaped pieces are chucked, it is often necessary to have the chuck and the piece in one relative position of rotation, and it is highly desirable always to stop the chuck or at least position the chuck in a certain definite position of rotation so that the pieces held in one predetermined position may be readily chucked without the necessity of presenting the pieces in various rotative positions dependent on the haphazard positioning of the chuck. This is particularly true when pieces are automatically or semi-automatically fed to the chuck, but it is also highly desirable to have the chuck stopped in definite positions of rotation when pieces are loaded by hand.

It is an object of the invention to provide improved chuck positioning means for always positioning a chuck in the same definite positions of rotation.

It is another object to provide improved chuck positioning means which is very simple in construction and which functions properly and without likelihood of any disorder of the parts.

It is another object to provide chuck positioning means for simultaneously positioning several chucks whereby a plurality of pieces may be chucked in the several chucks while stopped in definite positions of rotation.

It is another object to provide chuck positioning means so arranged that the chuck is preferably stopped in its rotation, and the chuck positioning means drives the chuck until it reaches the desired rotative position, after which the driving means is no longer effective.

Another object is to provide improved driving means for a chuck so arranged that, when the chuck reaches a definite position of rotation, the driving means is automatically disengaged from driving connection with the chuck.

A further object is to provide driving means for driving a chuck until it reaches a predetermined position of adjustment, and so arranged that the driving means may be positively moved to driving position, and which may be retracted by resilient means.

Other objects and various features of novelty and invention will be hereinafter pointed out or will become apparent to those skilled in the art.

In the drawings, which show, for illustrative purposes only, a preferred form of the invention embodied in a chuck positioning means arranged for simultaneously positioning a plurality of chucks:

Figure 1:
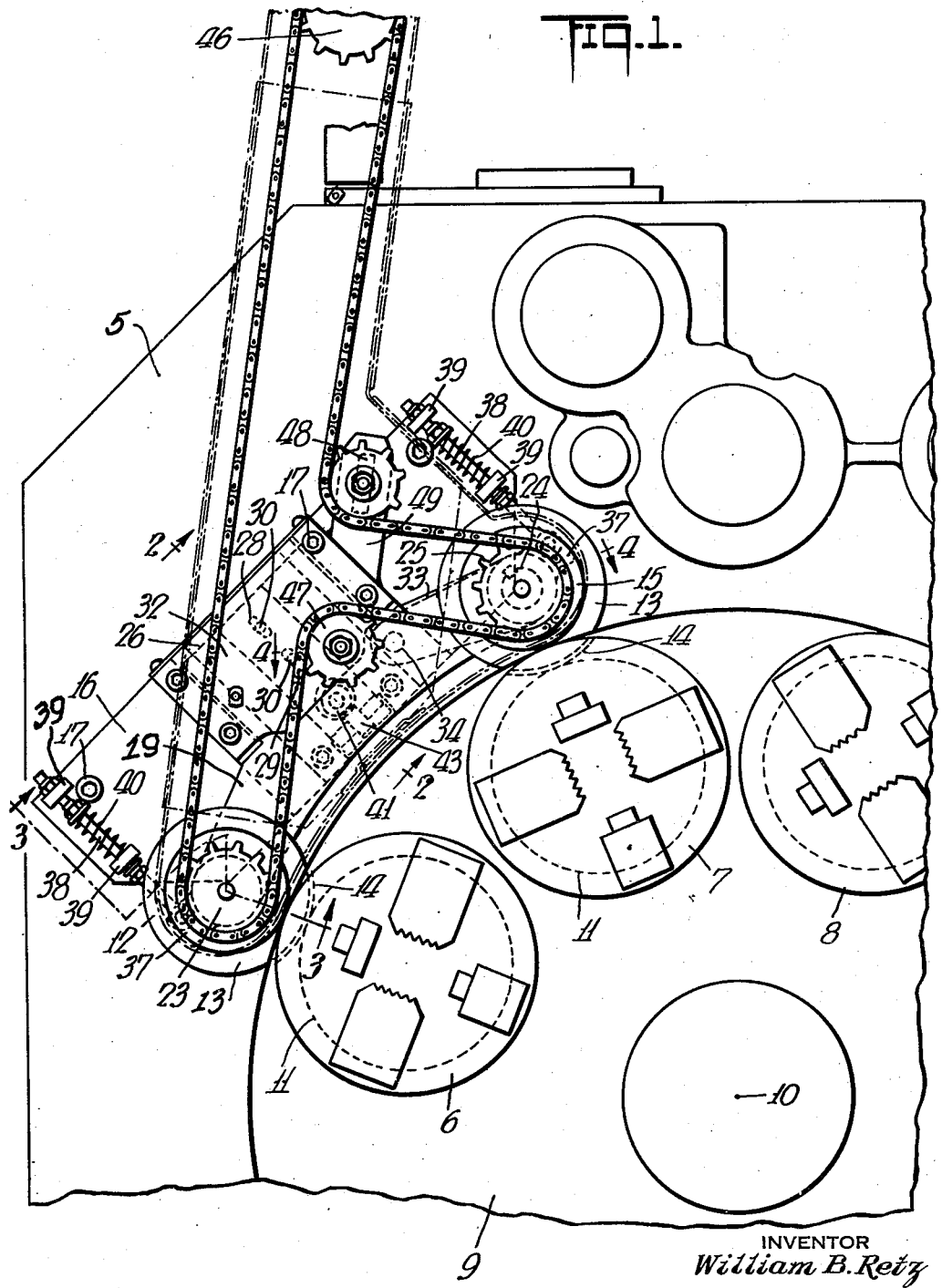
Fig. 1 is a fragmentary end view of a multiple spindle chucking machine illustrating one form of my improved chuck positioning means.
Figure 2:
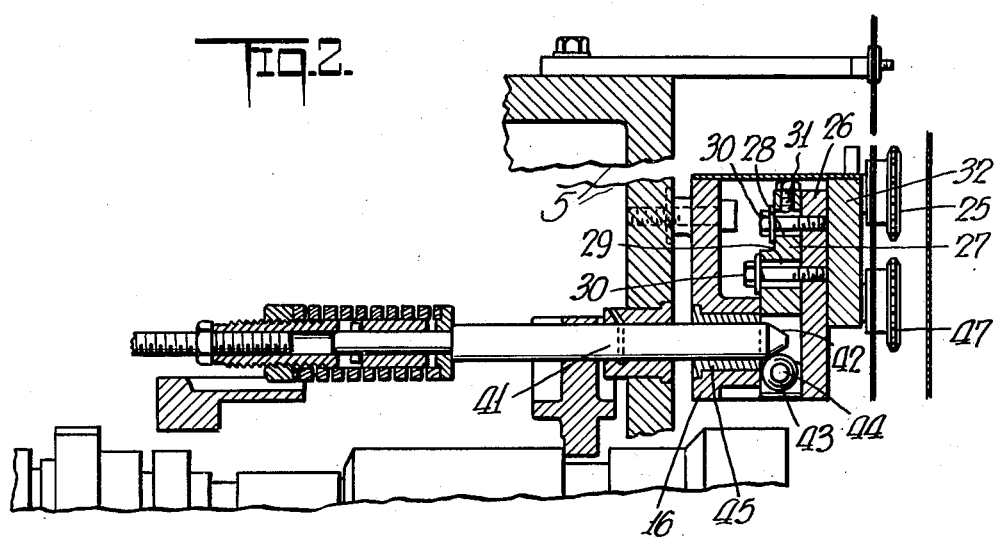
Fig. 2 is a sectional view taken substantially in the plane of the line 2—2 of Fig. 1.
Figure 3:
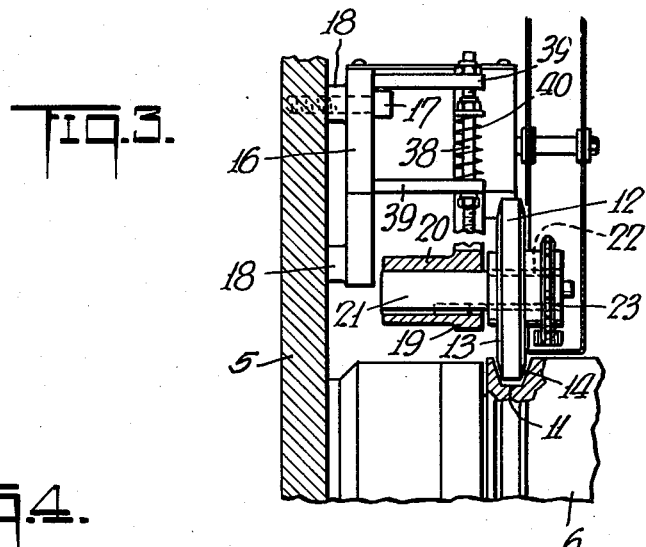
Fig. 3 is a sectional view taken substantially in the plane of the line 3—3 of Fig. 1.
Figure 4:
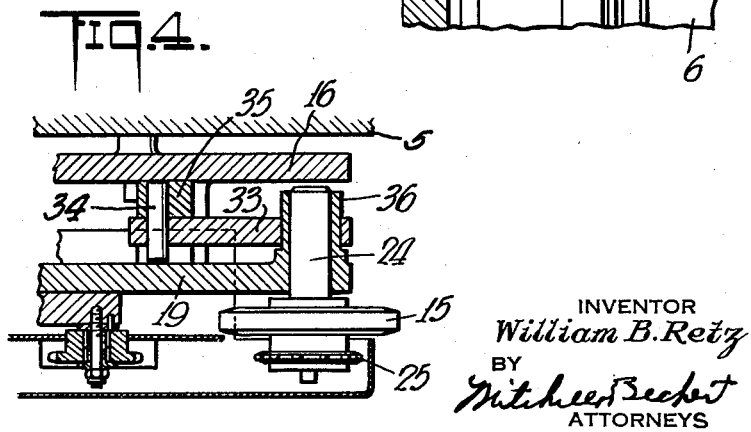
Fig. 4 is a sectional view taken substantially in the plane of the line 4—4 of Fig. 1.

Briefly stated, in a preferred form of the invention, the chuck or some part, such as a spindle, rotatable with the chuck, is driven by a rotative positioning means and the positioning means and parts are so arranged that, when the chuck reaches a predetermined rotative position, the driving means is automatically disengaged from driving connection with the chuck. In one form of chuck positioning means and driving means, the chuck or some part rotatable with the chuck is provided with a V-groove and the rotatable driving means is a driving pulley having a tapered periphery to fit in the V-groove for properly driving the chuck. The V-groove is preferably arranged at one spot so as to cause the driving means to be disengaged, and my improved means contemplates an enlargement of the V-groove so that, when the chuck is rotated until the driving pulley encounters the enlarged V-groove, the pulley does not touch the groove at all, or at least not with a force sufficient to drive the chuck, and therefore the chuck is stopped in one definite rotative position, depending on the location of the enlarged part of the V-groove. That stopped position is the position in which the work-pieces may be readily put into the chuck.

In the particular form shown in the drawing, I embody a plurality of positioning means for positioning a corresponding plurality of chucks, and each of the chuck positioning means may be substantial duplicates of each other. The invention, however, is useful in stopping one or more chucks in proper rotative positions.

In the particular form shown, the chuck positioning drive mechanism is all mounted on the plate or wall 5 of a machine tool, which, in the present instance, is an eight spindle, indexing type, work rotating chucking machine.

It should be here stated that, in normal operation of the chuck positioning means, whether a single chuck or a plurality of chucks are simultaneously positioned, the normal working drive for the chuck or chucks to be positioned will first be declutched and then brakes applied so as to stop or substantially stop rotation of the chuck or chucks before the chuck positioning driving means is engaged. Since declutching of a spindle or rotating chuck and braking of the same are common functions in machines of this type, the particular declutching and braking mechanism has been omitted; but suffice it to say that, before positioning a chuck or chucks, the latter will first be declutched from the normal drive and preferably stopped as by a brake, and then released by the brake.

In the form illustrated, the chucks 6, 7, 8, etc. are mounted as is usual on spindles rotatably mounted in the spindle carrier 9, which is indexible about the axis 10, all as will be understood and as is now common practice. In the illustrated form, the adjacent chucks 6, 7 are arranged for simultaneous positioning in predetermined positions of rotation. The chucks before positioning are first stopped or substantially stopped, and after they are stopped, my improved driving mechanism is brought into play for driving those chucks until the predetermined points of rotation are reached. In the form illustrated, each chuck, or any part rotated with the chuck such as the spindle, is preferably provided with a V-groove 11 in the periphery thereof, and the driving pulley 12, to be further described, is provided with a tapered driving surface 13 to fit the groove 11, and upon rotation drives the chuck until a predetermined point of rotation is reached. In the form illustrated, this particular point where the chuck is positioned is determined by the fit between the V-groove 11 and the tapered driving surface 13.

In the preferred form, at one predetermined angular position, each V-groove 11 is substantially enlarged, as indicated at 14, so that it is wider than the tapered driving surface 13, and when the drive pulley 12 reaches the position where the drive surface 13 no longer engages the sides of the V-groove 11, or engages such sides with a force less than is required to drive the chuck, the latter stops even though the driving pulley 12 continues to rotate. In this particular position of rotation, the piece parts may be chucked with the greatest facility and it is, of course, important to properly place the enlargement 14 and the chuck parts relative to each other so that the chuck will be stopped in that position—which is most convenient for the operator or most feasible for automatic feeding of the piece parts. In the particular form shown, the chucks 6, 7 are designed to be positioned simultaneously and the chuck 7 has a groove 11 therein and an enlargement 14, as heretofore described, for the pulley 15, which parts preferably correspond in every respect in construction and function with the corresponding parts described. As illustrated in Fig. 1, the enlargements 14 in the grooves are positioned so that the locator buttons are stopped in radial lines through the center 10. This position is most convenient for one particular work piece.

The construction of the various parts for permitting the actions above described for positioning the chucks will now be described. A base or supporting plate 16 is secured to the front wall 5 on the main frame of the chucking machine by means of screws 17, and suitable lugs such as 18 may be provided for spacing plate 16 away from the front wall 5 of the machine. The frame or yoke for carrying the driving pulleys 12, 15 preferably consists of an elongated bar member 19, which may have a boss 20 thereon for receiving a shaft 21, on which the drive pulley 12 may be mounted, preferably on a needle bearing or the like 22. A sprocket 23 is carried by or rotates with drive pulley 12 for driving the latter, as will be later described.

At the opposite end of the frame 19, the drive pulley 15 is mounted on its shaft 24 in the same way that the drive pulley 12 is mounted, as heretofore described. A sprocket 25 is mounted on or is driven with the drive pulley 15, as heretofore described in connection with the drive pulley 12. The yoke on frame 19 for carrying the drive pulleys 12, 15 has an upward extension 26. In back of the yoke 19, including the extension, is an actuating plate 27. This plate 27 is provided with slots 28—29 for receiving screws 30—30, which are threaded into yoke frame 26. An adjusting screw 31 is threaded and locked in the plate 27 so that, when the plate 27 is moved downwardly, the adjusting screw 31 engages the screw 30 and forces the yoke 19 and extension 26 downwardly to carry the drive pulleys 12, 15 into operative positions with the chucks. Yoke 19 and extension 26 are supported at the front by the plate 32, which in turn is supported by the frame plate 16 or by the main machine frame 5.

In order to assist in holding the yoke 19 and extension in proper position, I preferably provide a link 33, which fits a shaft 34 carried in a boss 35 between the yoke 19 and the frame plate 16. The other end of the link 33 extends about a boss or bushing 36 welded or otherwise rigidly secured to the yoke 19, so that, as the yoke 19 is moved up and down, the link 33 maintains it in position. The boss or bushing 36 carries the shaft 24, which in turn carries the drive pulley 15 and the sprocket 25 heretofore described.

The yoke 19 and extension 26 are moved into and out of engagement with the chucks and such movement in the retracting direction is done resiliently, while the movement into engagement with the chucks is done positively, as will be described. The yoke 19 at each end has an extension lug 37, preferably bifurcated, for receiving the bolts or links 38 which pass through bosses 39—39 on the plate 16. Springs, such as 40, surrounding the bolts or links 38, constantly urge those links 38 upwardly and tend to raise the entire yoke 19, and with it the driving pulleys 12, 15. The yoke 19 is moved by different means in the opposite or operative direction to cause driving connection between the drive pulleys 12, 15 and and their respective chucks. In the form shown, this last means consists of a pin or plunger 41 which normally would be connected to a clutch throw-out for the chucks, which structure and function, however, need not be here described since such clutch throw-outs are common. This pin or plunger 41 has a conical or tapered nose 42 which engages a roller 43 mounted on an axis 44 carried with the yoke 19, or, more properly, by the plate 27. Thus, when the pin 41, supported as it is by a bearing bushing 45 carried by the plate 16, is moved toward the right, the conical nose 42, acting on the roller 43, depresses the plate 27, and as soon as the adjusting screw 31 engages the screw 30 fastened to the yoke extension 26, the entire yoke and extension move downwardly into operative position with drive surfaces 13 on the drive pulleys 12, 15 in engagement with the V-grooves in the chucks. The drive pulleys 12, 15 are driven, in the present instance, by a chain drive from a gear or other type motor 46, mounted on the machine frame or any other suitable part. The chain passes over the sprocket 23 of the drive pulley 12, over an idler 47 carried by the plate 32, then over the sprocket 25 rotatable with the drive pulley 15, then over an adjustable idler pulley 48 mounted on plate 49 on the outside plate 32.

The general operation will now be clear. The gear motor or other motor for driving the drive pulleys 12, 15 may keep them under constant rotation and, except when they are positioning the chucks, these pulleys are raised to an out-of-the-way position by springs 40, raising the entire yoke 19, as will be clear. When two chucks, such as 6, 7, have been declutched and preferably braked, the drive pulley is moved into position by a movement of the pin 41, with its conical nose 42 acting on the roller 43, as heretofore described. The drive pulleys 12, 15 are thus moved into such position that the tapered surfaces 13 engage the adjacent sides of the V-groove 11 and rotate the chucks until such time as the drive pulleys 12, 15 enter the enlargements 14, as heretofore described. As soon as the drive pulleys get into the enlargements 14, there is no longer a proper driving contact with the chucks and the latter therefore stop. These enlargements are placed relatively to the chuck parts, so that the latter are in just the desired position for loading, either by hand or automatically. At any time after the chucks have been positioned, the yoke 19 carrying the drive pulleys may be permitted to rise to an out-of-the-way position ready for the next operation. The chucks, after having been loaded, are then clutched to the normal drive, the carrier indexed, and the usual turning procedures follow.

It will be seen that the V-grooves illustrated have been placed in the chucks themselves, but it is to be understood that those grooves could be in any member rotatable with the chucks, and, when stated herein that the grooves are in the chucks, it is to be understood that the term "chuck" includes any member rotatable with the chuck. Furthermore, it is to be understood that it is not necessary to position two chucks at one time. The arrangement is such that only a single chuck may be positioned. In other words, the principles of the invention are applicable to the positioning of one or a plurality of chucks.

While the invention has been described in considerable detail and a preferred form illustrated, it is to be understood that various changes and modifications may be made within the scope of the invention as defined in the appended claims.

I claim:

1. In a chuck positioning means, a driving member for the chuck, means moving said driving means continuously to rotate said chuck, a V-groove in the chuck, a tapered part on said driving member to fit the said V-groove for driving said chuck, said V-groove at one angular position being enlarged so as to be free of the driving means whereby the chuck will be stopped in a predetermined position in its rotation by said driving member.

2. In a chuck positioning means, a frame member carrying a pair of spaced driving means for driving a pair of chucks, means for driving said driving means continuously, spring mounting means for said frame for urging said driving members to a position out of driving contact with said chucks, means intermediate said spaced driving means for moving said framework in a direction to cause driving connection between said driving means and said chucks, said chucks having cut-away surfaces to break the driving connection between said driving means and said chucks when the latter reach predetermined but independent rotative positions.

3. In a chuck positioning means for positioning a pair of chucks which comprises a driving means for each of said chucks, a chain for driving said driving means, spring means for urging said driving means into inoperative positions, means acting in opposition to said spring means for moving said driving means into driving engagement with said chucks so as to rotate the latter, each of said chucks having means to break the driving connection between said driving means and said chucks when the latter reach predetermined positions of rotation.

4. In a chuck positioning means, a spindle carrier having a plurality of rotatable chucks, a machine frame for sustaining said spindle carrier, chuck positioning means carried by said main frame and including a pair of driving members for driving a plurality of said chucks simultaneously, and means for breaking connections between said chucks and said driving means when said chucks reach predetermined but independent rotative positions.

5. In a chuck positioning means, a chuck having a V-groove therein, a rotary driving member having a peripheral part fitting in said V-groove for driving the chuck, said V-groove having an enlargement at one point to break connection between the driving means and the V-groove, whereby said chuck will be stopped in a predetermined position of rotation.

6. In a chuck positioning means for positioning a plurality of chucks which includes a frame member carrying a pair of driving members for driving a pair of chucks, a machine frame for carrying said chuck positioning means, said frame carrying said driving means having a linked connection to said main machine frame for positioning said driving means, said chucks and driving means having means for breaking driving connection between said driving means and said chucks when the latter reach predetermined rotative positions.

7. In a chuck positioning means, a chuck, a driving member for said chuck, said chuck and said driving member having driving surfaces to coact with each other to drive said chuck by said driving member, said driving surface on said chuck being interrupted at one predetermined circumferential point so as to disengage said driving member from said chuck when the latter reaches said one predetermined circumferential position.

References Cited in the file of this patent

UNITED STATES PATENTS 2,693,872     Baader _____ Nov. 9, 1954